(12) United States Patent
Kanstad et al.

(10) Patent No.: US 10,550,949 B2
(45) Date of Patent: Feb. 4, 2020

(54) BARRIER FLUID PRESSURE SYSTEM AND METHOD

(71) Applicant: OneSubsea IP UK Limited, London (GB)

(72) Inventors: Stig Kaare Kanstad, Bergen (NO); Kjartan Juul Skarboe, Bergen (NO); Anders Brunvold, Blomsterdalen (NO)

(73) Assignee: ONESUBSEA IP UK LIMITED, London (GB)

( * ) Notice: Subject to any disclaimer, the term of this patent is extended or adjusted under 35 U.S.C. 154(b) by 53 days.

(21) Appl. No.: 15/674,748

(22) Filed: Aug. 11, 2017

(65) Prior Publication Data
US 2018/0058597 A1 Mar. 1, 2018

Related U.S. Application Data (60) Provisional application No. 62/378,420, filed on Aug. 23, 2016.

(51) Int. Cl.
*F16K 31/12* (2006.01)
*F16K 17/04* (2006.01)
(Continued)

(52) U.S. Cl.
CPC .......... *F16K 17/0493* (2013.01); *E21B 43/01* (2013.01); *F04B 47/06* (2013.01);
(Continued)

(58) Field of Classification Search
CPC .... F16K 17/0493; E21B 43/01; F04D 29/104; F04D 29/108; F16J 15/406;
(Continued)

(56) References Cited

U.S. PATENT DOCUMENTS

| 2,593,939 | A | * | 4/1952 | Trist | ........................ F16J 15/363 |
| | | | | | 277/362 |
| 3,176,996 | A | * | 4/1965 | Barnett | .................. B63H 23/36 |
| | | | | | 277/318 |

(Continued)

FOREIGN PATENT DOCUMENTS

| JP | S5716296 A | 1/1982 |
| JP | S5744794 A | 3/1982 |

(Continued)

OTHER PUBLICATIONS

Extended European Search Report issued in European Patent Application No. 17187331.8 dated Jan. 25, 2018; 9 pages.

*Primary Examiner* — Minh Q Le
(74) *Attorney, Agent, or Firm* — Brandon S. Clark (57) ABSTRACT

System and methods are configured to adjust fluid pressure within a barrier fluid system on a subsea fluid processing machine. More specifically, a barrier fluid pressure system is located at the subsea location and includes a barrier fluid pressure regulator module having one input communicating or being pressure matched with a process fluid flowline and a second input communicating with the barrier fluid pressure system. The pressure regulator module is configured to locally adjust the barrier fluid pressure depending upon the fluid process pressure.

13 Claims, 9 Drawing Sheets

(51) Int. Cl.
*E21B 43/01* (2006.01)
*F04D 29/10* (2006.01)
*F04B 47/06* (2006.01)

(52) U.S. Cl.
CPC ...... *F04D 29/104* (2013.01); *F15B 2201/205* (2013.01); *Y10S 277/926* (2013.01)

(58) Field of Classification Search
CPC ............ F15B 2201/205; F15B 2201/30; F15B 2215/00; Y10S 417/00; Y10S 277/927; Y10S 277/929; Y10S 277/926
USPC ........ 137/488; 277/387, 388, 389, 427, 431, 277/432
See application file for complete search history.

(56) References Cited

U.S. PATENT DOCUMENTS

| | | | | |
|---|---|---|---|---|
| 3,403,915 A | * | 10/1968 | Roberts | F16J 15/40 277/511 |
| 3,544,116 A | * | 12/1970 | Peterson | F16J 15/40 277/500 |
| 3,740,057 A | * | 6/1973 | Doyle | F16J 15/40 277/366 |
| 3,835,714 A | * | 9/1974 | van der Aa | F16J 15/26 277/549 |
| 4,128,248 A | * | 12/1978 | Kabelitz | F16J 15/40 277/558 |
| 4,206,928 A | * | 6/1980 | Asano | F02G 1/05 277/317 |
| 4,460,181 A | * | 7/1984 | Araoka | F16J 15/40 277/318 |
| 4,621,981 A | * | 11/1986 | Lorett | F04D 29/128 210/787 |
| 4,769,992 A | * | 9/1988 | Harada | F02G 1/0435 277/401 |
| 5,211,532 A | | 5/1993 | Thompson | |
| 5,636,847 A | * | 6/1997 | Ostrowski | F04D 29/128 277/317 |
| 5,769,427 A | * | 6/1998 | Ostrowski | F04D 29/128 277/318 |
| 5,772,216 A | * | 6/1998 | Bredemeyer | F16J 15/406 277/318 |
| 5,796,427 A | | 6/1998 | Ostrowski | |
| 6,158,967 A | * | 12/2000 | Dupre | F04B 9/105 277/300 |
| 6,505,834 B1 | * | 1/2003 | Dinc | F01D 11/025 277/355 |
| 9,303,654 B2 | † | 4/2016 | Felix | |
| 2010/0015000 A1 | * | 1/2010 | Andrews | F04D 29/128 418/88 |
| 2015/0316162 A1 | † | 11/2015 | Ottestad | |
| 2016/0341209 A1 | * | 11/2016 | Landi | F04D 13/086 |
| 2017/0002651 A1 | * | 1/2017 | Tvedt | E21B 41/04 |
| 2017/0183942 A1 | * | 6/2017 | Veland | F04D 29/126 |
| 2018/0209425 A1 | * | 7/2018 | Solberg | E21B 33/0355 |
| 2018/0223854 A1 | * | 8/2018 | Brunvold | F04D 1/066 |
| 2018/0231005 A1 | * | 8/2018 | Elvebakken | E21B 33/0355 |

FOREIGN PATENT DOCUMENTS

| | | |
|---|---|---|
| WO | 0125634 A1 | 4/2001 |
| WO | 2011048213 A2 | 4/2011 |
| WO | 2011161515 A1 | 12/2011 |
| WO | 2011161516 A1 | 12/2011 |
| WO | 2015081216 A1 | 6/2015 |
| WO | 2016032521 A1 | 3/2016 |
| WO | 2016048163 A1 | 3/2016 |

\* cited by examiner
† cited by third party

BARRIER FLUID PRESSURE SYSTEM AND METHOD

REFERENCE TO RELATED APPLICATIONS

This patent application claims the benefit of and incorporates by reference U.S. Provisional Patent Application Ser. No. 62/378,420 filed on Aug. 23, 2016.

TECHNICAL FIELD

The present disclosure relates to a system and method to supply barrier fluid to subsea equipment. More specifically, the present disclosure relates to a system and method to supply barrier fluid to subsea fluid processing equipment.

BACKGROUND

In the subsea oil and gas industry, it is often desirable to perform certain fluid processing activities on the sea floor. The processed fluid in subsea hydrocarbon production is typically a multiphase fluid comprising oil and gas and eventually solid matter, that is extracted from an underground reservoir. The processing system is arranged on the sea floor and configured for transport of the process fluid from the reservoir to a surface or land based host facility. Examples of processing systems include fluid pumps (both single phase and multiphase) and compressors (both gas compressors and "wet gas" compressors).

The processing system is subject to variations in pressure in the pumped medium, as well as transitional loads during start and stop sequences. Corresponding measures can be used to prevent process fluid and particulate matter from migrating from the pump interior into a motor housing, and into bearings and seals of the processing system.

In known examples of processing system like pumps or compressors, a motor typically drives a shaft located in a pump section. The motor comprises a housing interior that is hydraulically separated from the pump housing interior by a seal arrangement. A barrier fluid (often a hydraulic fluid) in the motor housing is controlled at a pressure above the internal pressure of the pump. The barrier fluid therefore acts as a barrier that prevents intrusion of process fluid and particles into the motor, the bearing arrangements, and other internal components via the mechanical seals. However, as a result of the pressure difference and intended functionality of mechanical seals, a leak flow of barrier fluid from machine "clean" side to the machine "process" side occurs. This leak flow is referred to as "barrier fluid consumption," which in a typical setting can be at a rate of about 0-1 liters per hour.

To compensate for an eventual barrier fluid consumption, it is known to have a barrier fluid supplied from a host facility, and leakage compensation as well as pressure control managed from the host facility, usually via an umbilical. As subsea hydrocarbon production sites tend to be installed and operated at increasing depths and step-out distances, the pressure response times and control requirements in the barrier fluid systems increase correspondingly. As a consequence, there is a rising need for a barrier fluid system that operates with improved control requirements and which provides increased reliability in operation.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

The present disclosure describes a system and method to supply barrier fluid to subsea fluid processing machines. The subsea machines can be subsea rotating machines such as pumps, compressors, separators, as well as other subsea fluid processing machines such as subsea piston pumps in underwater electric pump stations (e.g. MEPS multiphase electric pump stations. According to some embodiments, a system and method are provided to adjust the barrier fluid pressure depending upon the process fluid pressure.

According to some embodiments, a system is described for regulating subsea barrier fluid pressure used to lubricate a subsea fluid processing machine. In addition to lubricating, the barrier fluid can also be used as a coolant for the motor and as an overpressure barrier to avoid ingress from the process fluid. The pressure regulation system includes a housing and a movable member disposed within the housing and configured to longitudinally translate within the housing. The member has first and second surfaces that together with an inner portion of the housing define first and second volumes that are variable in size, depending on the longitudinal position of the moveable member. The first volume is configured to be filled with barrier fluid and be in fluid communication with barrier fluid circulating in the fluid processing machine. The second volume is configured to be in fluid communication, or at least pressure matched, with the process fluid in the fluid processing machine. The pressure regulation system further includes a biasing mechanism configured to maintain the fluid pressure of the barrier fluid circulating in the machine at a predetermined differential above the fluid pressure of the process fluid in the fluid processing machine at least in part by translation of the moveable member.

According to some embodiments, the biasing mechanism includes a spring (e.g. mechanical or gas) configured to exert a force on the moveable member towards the first volume, thereby causing pressure in the first volume to be greater than the second volume. Barrier fluid can be added to the barrier fluid circulating in the machine by movement of the member towards the first volume thereby making the first volume smaller, and barrier fluid can be removed from the barrier fluid circulating in the machine by movement of the member away from the first volume thereby making the first volume larger.

According to some embodiments, the predetermined differential pressure is a fixed or variable amount, and according to some other embodiments, it is a fixed or variable proportion. In the case of a fixed or variable proportion, the first surface can be larger than the area of the second surface. According to some embodiments, a second housing can be provided with its own moveable member and biasing mechanism. In some cases, the first and second housings and biasing mechanisms can be configured to together assure that the amount by which the fluid pressure of the barrier fluid exceeds that of the process fluid stays within a window defined by the first and second biasing mechanisms.

As used herein, a barrier fluid system refers to a hydraulic system that protects operation of internal components of the pump, compressor or other machine by ensuring lubrication, cooling and/or avoiding corrosion. Within an electric motor the barrier fluid may also have certain desirable dielectric properties depending on the motor's insulation system.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The particulars shown herein are for purposes of illustrative discussion of the embodiments of the present disclosure only. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

Figure 1:
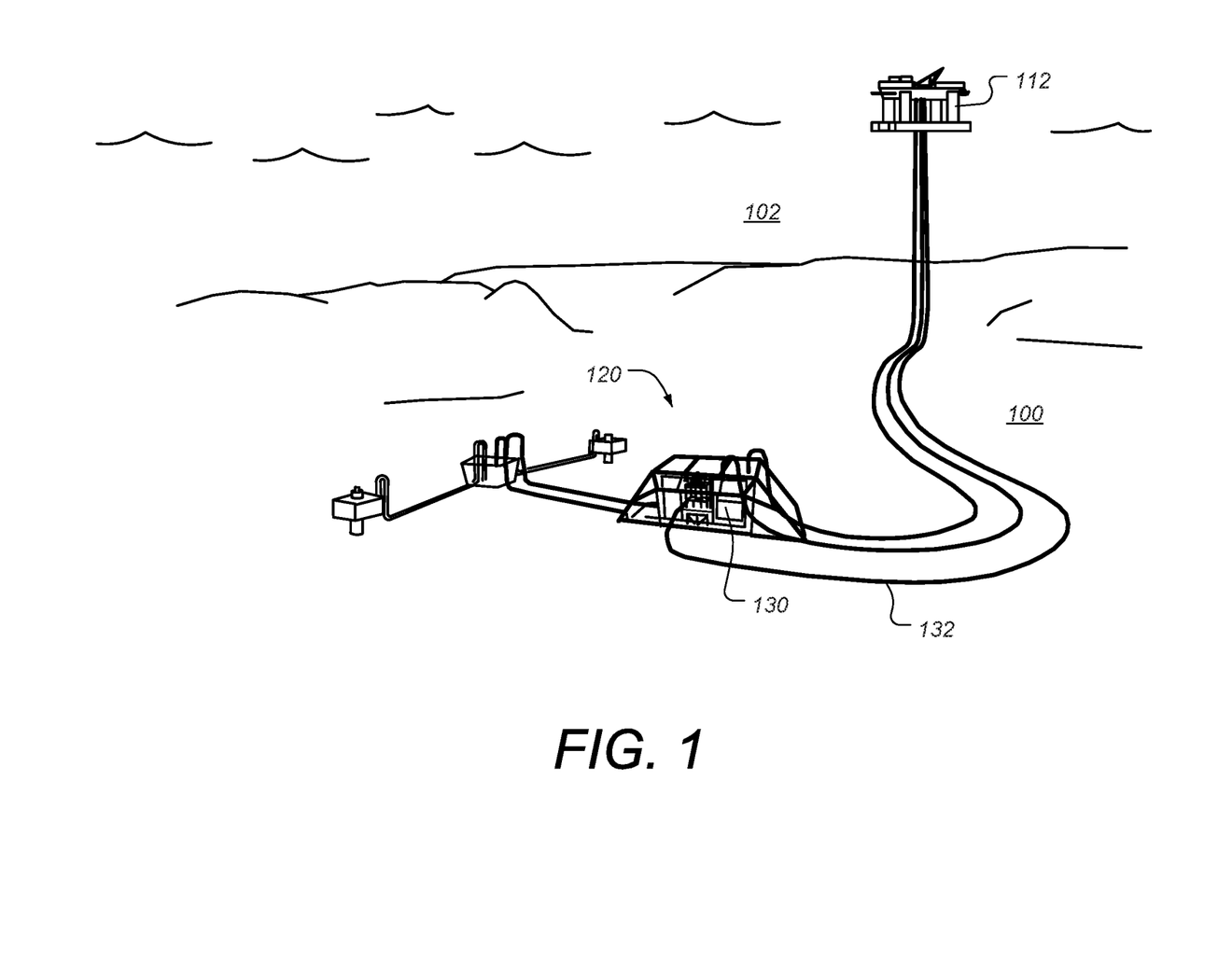
FIG. 1 is a diagram illustrating a subsea environment in which a barrier fluid pressure system might be deployed, according to some embodiments.

FIG. 1 is a diagram illustrating a subsea environment in which a barrier fluid pressure system might be deployed, according to some embodiments. On seafloor 100 a station 120 is shown which is downstream of several wellheads being used, for example, to produce hydrocarbon-bearing fluid from a subterranean rock formation. Station 120 might also be used to inject fluid within the subterranean rock formation via one or more wellhead(s). Station 120 includes a subsea fluid processing module 130, which is powered by one or more electric motors, such as induction motors or permanent magnet motors. According to some embodiments, processing module 130 may include a rotating machine such as a compressor and/or pump. According to some other embodiments, processing module 130 can be a pump module as part of a multiphase electric pump station (e.g. MEPS). The station 120 is connected to one or more umbilical cables, such as umbilical 132. The umbilical in this case is being run from a platform 112 through seawater 102, along sea floor 100 and to station 120. In other cases, the umbilical may be run from some other surface facility such as a floating production, storage and offloading unit (FPSO), or a shore-based facility. The umbilical 132 is used to supply barrier and other fluids, and control and data lines for use with the subsea equipment in station 120. A barrier fluid system for the processing module 130 comprises both topside and subsea accumulators in order to allow controlling subsea pressure in various scenarios and is regulated in intervals depending on the pressure on the process fluid that goes through the processing module 130.

According to some embodiments, station 120 is configured for subsea fluid processing functions such as subsea pumping, subsea compressing, and/or subsea separation. In all embodiments described herein, it is understood that references to subsea compressors and compressor modules can alternatively refer to subsea pump and pumping modules. Furthermore, references herein to subsea compressors and subsea pumps should be understood to refer equally to subsea compressors and pumps for single-phase liquids, single-phase gases, or multiphase fluids. According to some embodiments, the pump described herein might be used in connection with an electrical submersible pump (ESP) which can either be located downhole or in a subsea location such as on the sea floor, in a Christmas tree, at wellhead, or any other location on a flow line.

During operation of the processing module 130, pressurized barrier fluid is circulated through bearings and seals of the fluid processing machines (e.g., pump or compressor) for lubrication, cooling and removal of any contamination. The barrier fluid is maintained at a pressure higher than or equal to the pump cavity (or compressor cavity) pressure, i.e. higher than or equal to the pressure of process fluid that goes through the processing module 130, to ensure that possible leakage flow is in the direction from the motor side (clean) to the pump side (which might be contaminated). Intentionally, a low flow rate of barrier fluid might leak out from the barrier fluid system toward the pump section internals, to ensure sufficient lubrication, cooling and cleaning of the mechanical shaft seals. The consumed barrier fluid is replaced continuously or periodically. At steady state operation, this consumption is small. However, during transient operation, such as at a change in reference pressure or barrier fluid temperature, the leakage or barrier fluid consumption is larger.

Known systems are used to supply and control subsea barrier fluid. These include topside and subsea accumulators comprising, for example, a topside barrier fluid bank, topside barrier fluid pump(s) and/or subsea barrier fluid pump(s).

Pressure of the barrier fluid might be regulated via a pressure regulator, like those described in patent application publication US20150316162 or patent application publication WO2016048163. However, the reliability of these pressure regulators, whether mechanical or electrical, could be improved for some scenarios. An example of when improvements would be desirable include situations where a reduction of the barrier fluid pressure needs to be sufficiently rapid to avoid excessively large differential pressures across mechanical seals, particularly for field applications with very large dynamic pressure range in operation.

Figure 2:
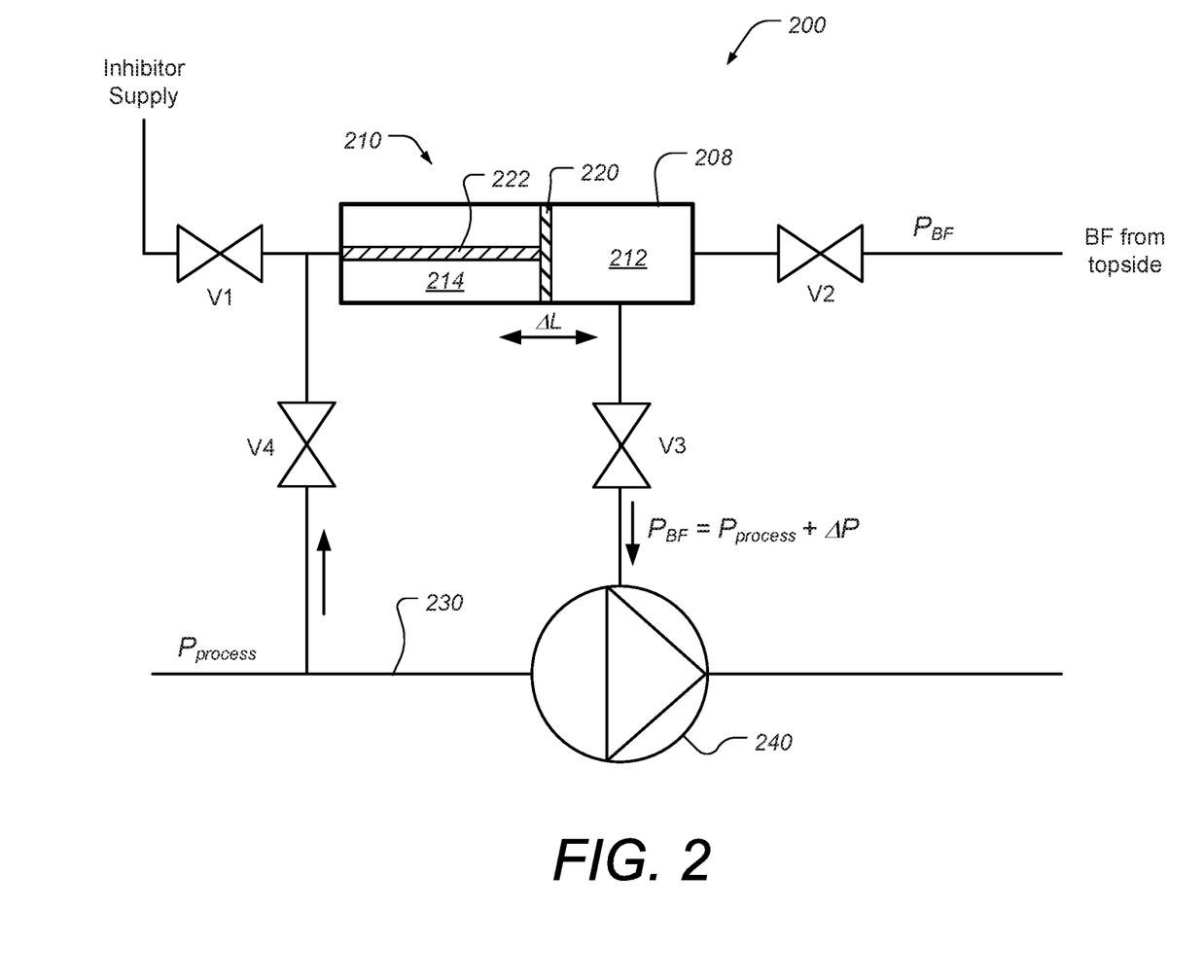
FIG. 2 is a schematic diagram illustrating aspects of a barrier fluid pressure control system, according to some embodiments.
Figure 3:
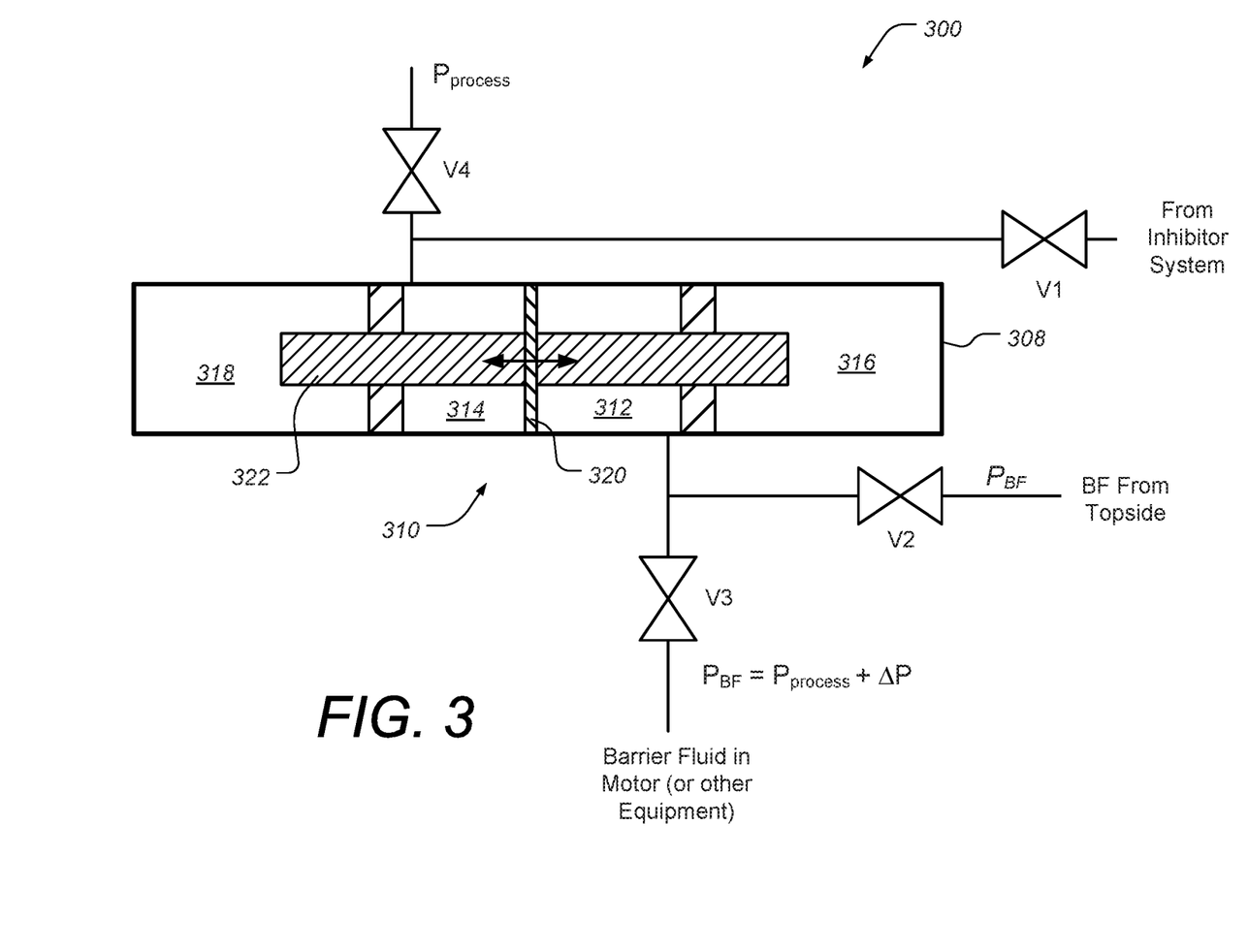
FIG. 3 is a schematic diagram illustrating aspects of a gas-spring barrier fluid pressure control system, according to some embodiments.
Figure 5:
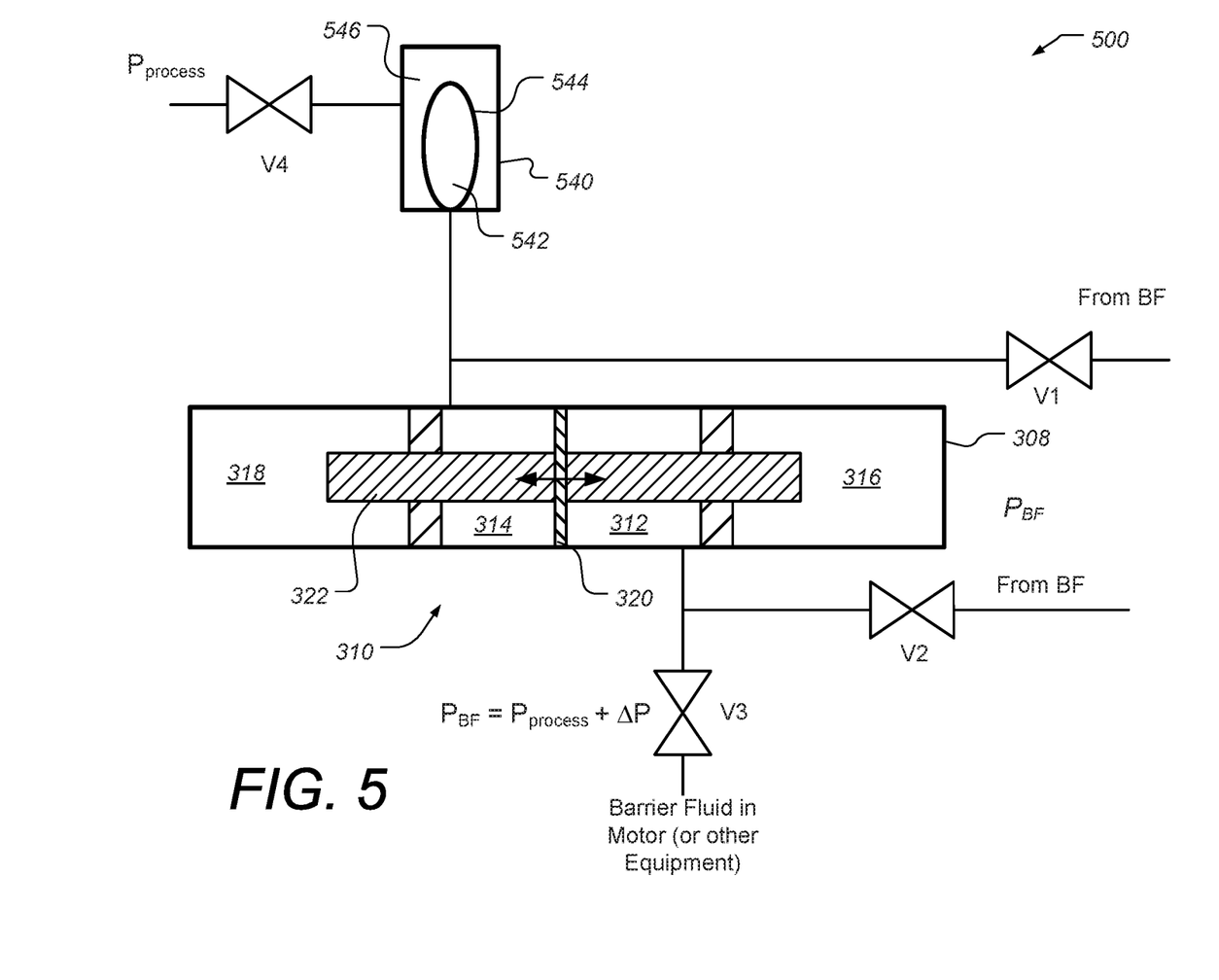
FIG. 5 is a schematic diagram illustrating aspects of a barrier fluid pressure control system, according to some other embodiments.

FIG. 2 is a schematic diagram illustrating aspects of a barrier fluid pressure control system, according to some embodiments. System 200 is shown which might be located within the processing module 130 of station 120 shown in FIG. 1. In the example shown in FIG. 2, system 200 includes a barrier fluid pressure regulator module 210 that includes a cylinder housing 208 that houses a piston 220. The piston 220 separates the interior volume of cylinder housing 208 into a first volume 212 and a second volume 214. The first volume 212 is filled with barrier fluid, and a second volume 214 is initially filled with, for example, process fluid. In embodiments wherein cleaning or hydrate melting is required or desired, 214, via valve V1, might receive an injection of monoethylene glycol (MEG) or methanol (MeOH) or other known hydrate inhibitor. According to some embodiments, valve V1 can receive an injection of any other known cleaning and/or preserving fluid. In embodiments, the second volume 214 is in fluid communication via a valve V4 with the process flow line 230 wherein the hydrocarbon-bearing fluid (or process fluid) flows. The pressure in the second volume 214 is hence similar to the process fluid pressure. According to some embodiments, piston 220 is spring loaded with a spring 222. Spring 222 enables the pressure in the first volume 212 to remain higher than the flow line pressure or the pressure in the second volume 214 when piston 220 is in a mid position and force equilibrium is governed by the hydraulic forces and spring force, i.e.:

$$P_{BF} = P_{process} + \frac{F_{spring}}{A}$$

$$P_{BF} = \frac{F_{spring}}{A} = \frac{k_{spring} L}{A}$$

Wherein A is the sectional area of the spring loaded piston 220, L is the relative displacement of the spring loaded piston 220 inside the barrier fluid pressure regulator cavity (of housing 208), $F_{spring}$ is the force applied by spring 222 on piston 220, $k_{spring}$ is the spring constant of spring 222, and $P_{BF}$ is the barrier fluid pressure ($P_{BF}$) differential compared to the process fluid pressure ($P_{process}$). Spring 222 can be a coil type compression spring made of spring steel and bias to apply a net force towards volume 212 such that volume 212 has a higher pressure than volume 214. However, the module 210 can be configured to use other types of spring in other configurations, according to some embodiments. For example, a tension spring could be used instead and positioned within volume 212 instead of within volume 214. Non-coil type mechanical springs could be used such as cantilever, volute, leaf, V, elastomer, gas, or a combination of the foregoing. Examples of gas springs are shown in FIGS. 3 and 5. Although barrier fluid pressure regulator module 210 is described as including a cylinder housing 208, the shape of the housing 208 and the volumes 212 and 214 can be but are not necessarily that of a right circular cylinder. As used herein the terms "cylinder" and "cylindrical" are not limited to circular cylinder shapes. According to some embodiments, the cylinder housing 208 and volumes 212 and 214 can be configured in shapes such as a type of prism (e.g. rectangular prism or square prism).

As used herein the phrase "mid position" for the piston 220 refers to any position as long as there is still a small cavity remaining of either volume 212 or 214 still being in force balance. The reason for shifting the piston to the left or right can include either thermal expansion/contraction and/or barrier fluid consumption. To fully compensate for a thermal expansion or contraction the piston could be moved sufficiently in either direction to counteract the volume of fluid expansion or contraction. In an example, the piston is initially biased toward the left if used to compensate for barrier fluid consumption after a periodic topping up from topside. The piston will gradually shift towards right as the amount of barrier fluid in the system is reduced due to consumption prior to the next topping up.

According to some embodiments, and as shown in FIG. 2, opening valve V3 allows the barrier fluid fluid in volume 212 to be in pressure communication with the barrier fluid inside the pump 240. Opening up valve V4 makes volume 214 to be in pressure communication with the process pressure ($P_{process}$). In use, both valves V3 and V4 are opened such that the barrier fluid pressure system sees the process fluid pressure and pressurizes the barrier fluid so the barrier fluid pressure remains greater than or equal to the process fluid pressure. According to some embodiments, valve V2 may be used when the accumulated barrier fluid consumption has been such that the system needs to be refilled from, for example, the topside via umbilical 132 run from a platform 112 (shown in FIG. 1). According to some embodiments, refilling the first volume 212 can be done automatically by using end switches in the housing 208 capable of communicating to the system that filling of volume 212 is needed so that valve V2 is actuated. Also, refilling of barrier fluid could be accomplished using a Remotely Operated Vehicle (ROV) during, or at any time after, the processing machine installation. According to some other embodiments, refilling could be accomplished using a subsea tank or a subsea hydraulic power unit (HPU).

According to some embodiments, valve V1 can be used to wash out of any seawater ingress during intervention and/or to remediate or prevent hydrates and "clean" the process side of the barrier fluid pressure system at intervals if desired.

According to some embodiments, the barrier fluid consumption when the pump 240 is running will be higher than when the pump is not running. In some cases, such as due to thermal expansion and/or contraction during pump start-up and/or shut down, it maybe desirable to add or remove an amount of barrier fluid in order to maintain the desired pressure differential between the barrier fluid and process fluid. Shutting down pump 240 will make the barrier fluid in the pump 240 start to cool down and contract. The barrier fluid pressure inside the pump will then start to drop. This is prevented by the process pressure pushing the piston 220 towards right expanding volume 214 reducing volume 212. This pushes barrier fluid into the pump 240 counteracting the barrier fluid contraction. Hence, an unwanted pressure drop is prevented. Starting up the pump 240 will cause the barrier fluid to expand and increasing the barrier fluid pressure. This pressure will push the piston 220 towards left increasing volume 212 and decreasing volume 214. An unwanted pressure increase is thereby prevented by allowing the barrier fluid to expand into volume 212 while pushing process fluid out of volume 214.

In some cases, it is desirable to adjust the barrier fluid pressure by changing the local barrier fluid volume in volume 212. According to some embodiments, the amount of barrier fluid to be removed or added is system dependent but in some cases it is about 10-50 liters. According to some embodiments, barrier fluid pressure system 200 is configured to allow for both removing barrier fluid out of the system (e.g. during start up due to thermal expansion) as well as adding barrier fluid into the system (e.g. due to thermal contraction after shut down or due to barrier fluid consumption when the pump is running). Similarly, according to some embodiments, system 200 can be configured to handle abandoned field applications where barrier fluid overpressure may need to be maintained to prevent process fluid ingress that could damage the pump 240. The barrier fluid pressure system 200 may include sensors detecting when the system is filled up and when the system needs to be fed or refilled with barrier fluid. Examples of sensors that could be used include: magnetic position sensors; capacitive sensors; and end switches. According to some embodiments, the sensors are used to enable automatic barrier fluid filling and dumping.

According to some embodiments, the second volume 214 may be initially filed with a hydrate inhibitor such as MEG or MeOH. However, over time the inhibitor might be replaced with a process fluid. Accordingly, "flushing" the second volume 214 might be undertaken at regular or irregular intervals to reduce hydrate formation risk. According to some embodiments, flushing of volume 214 could be performed for other reasons, such as to reduce or eliminate wax and/or sand. According to some embodiments, the barrier fluid pressure system 200 is configured to be retrievable with, or independently of, the processing module 130 or the whole station 120 (shown in FIG. 1). According to some embodiments, the system 200 might also be configured to further reduce hydrate formation risk. For example, the second volume 214 might be heated by barrier fluid cooling coils (not shown) when the pump 240 is running to further reduce hydrate formation risk. In some embodiments, heat pipes or other means may also be used to heat the second volume 214.

FIG. 3 is a schematic diagram illustrating aspects of a gas-spring barrier fluid pressure control system, according to some embodiments. Barrier fluid pressure system 300 is similar to and can be used in many of the same applications as system 200 shown in and described with respect to FIG. 2. In this case, barrier fluid pressure regulator module 310 includes a gas spring arrangement. As with housing 208 in FIG. 2, within housing 308 of FIG. 3 is a first volume first volume 312 filled with barrier fluid, and a second volume 314 filled with a hydrate inhibitor or process fluid. However, on both sides of module 310 are gas-filled compartments 316 and 318. The barrier fluid system is hence in pressure balance save the gas spring created by the gas filled compartments 316 and 318. Volume 314 is exposed to process pressure through valve V4. Volume 312 is exposed to process pressure plus the pressure from the gas spring force of volumes 316 and 318. The pressure of volume 312 is at barrier fluid pressure that is also transferred to the pump (or other processing module) through valve V3.

According to some embodiments, volume 316 is filled with low pressure gas while volume 318 is filled with high pressure gas. From the pressure difference between the gas in volumes 316 and 318 there is a force pushing the piston 322 towards volume 318, in FIG. 3. This is illustrated as towards the right side of module 310. The force from the gas pressure differential serves to pressurize the barrier fluid in volume 312. Furthermore, the gas pressure differential automatically maintains an overpressure as barrier fluid is consumed and the piston 320 is moved. Hence:

$$F = (p_{gas-318} p_{gas-316}) A_{gas}$$

Where F is the force pushing piston 322, $p_{gas-318}$ is the pressure of the high pressure gas (e.g., in volume 318 of FIG. 3) $p_{gas-316}$ is the pressure of the low gas pressure (e.g., in volume 316 of FIG. 3), and $A_{gas}$ is the cross sectional area of piston 322.

The force F corresponds to an increase in barrier fluid pressure ($P_{BF}$) given $$p_{process} + \frac{(p_{gas-318} - p_{gas-316}) d_{gas}^2}{D_{BF}^2 - d_{gas}^2}$$

Wherein $D_{BF}$ is the diameter of the separation of piston 320 inside housing 308 between the volumes 312 and 316, and $d_{gas}$ is the diameter of the piston 322 (having cross-sectional section A).

The (pressure*volume) product being constant in a closed cavity, the gas spring constant in module 310 can be adjusted to ensure that the pressure difference between the gas filled compartments 316 and 318 ensures overpressure in the barrier fluid in volume 312. It is to be noted that the gas volumes in the above equations are assumed (for simplicity) to be sufficiently large so that one can neglect pressure changes due to gas volume changes.

According to some embodiments, the gas compartments 316 and 318 can also each be equipped with a vent and a drain to allow increases or decreases of the pressure in either compartment. This could be useful, for example in cases of a gas leakage or a liquid leakage. According to some embodiments, an ROV could connect the barrier fluid regulator to communicate with volume 316 or 318 for re-pressurization. Likewise, in a situation wherein barrier fluid may leak from 312 into 316 and increase the pressure in volume 316, an ROV could be used to drain out liquid from volume 316. For pressure compensation during installation or intervention, according to some embodiments, the gas filled compartments 316 and 318 could be pressurized prior to installation in the processing module 130. First volume 312 could also be filled with the desired amount of barrier fluid, and the second volume 314 could be in pressure communication with the ambient environment. In such a configuration, where the pump piping is filled with seawater during installation and/or retrieval, the second volume 314 could be pressurized by ambient sea water (as if it was process fluid). If valves V3 and V4 are both left open during intervention, the barrier fluid pressure within first volume 312 will remain above the flow line pressure $P_{process}$.

Figure 4:
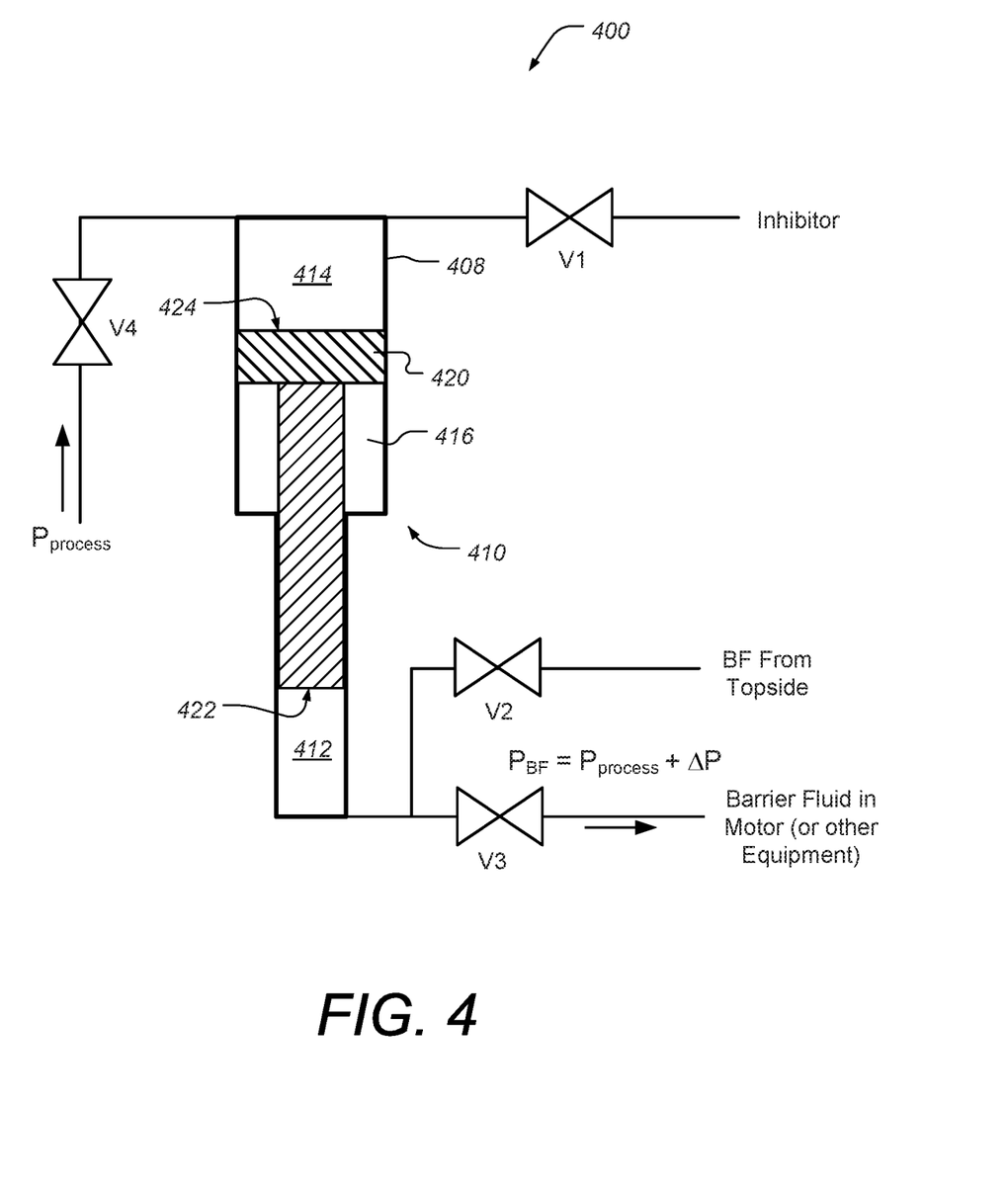
FIG. 4 is a schematic diagram illustrating aspects of a barrier fluid pressure control system, according to some other embodiments.

FIG. 4 is a schematic diagram illustrating aspects of a barrier fluid pressure control system, according to some other embodiments. Barrier fluid pressure system 400 is similar to and can be used in many of the same applications as systems 200 and 300 shown in and described with respect to FIGS. 2 and 3. Barrier fluid pressure regulator module 410 includes a housing 408, as well as first and second volumes 412 and 414. The volumes 412 and 414 are separated by a piston 420 that includes a larger area of a surface 424 exposed to volume 414 and smaller area of a surface 422 exposed to volume 412. The piston 420 and housing 408 also define a compartment volume 416 for a gas spring. Volume 414 might be initially filled (or pressurized) with process fluid. Also, if needed, 414 might be put in communication via valve V1 with a supply of hydrate inhibitor, for example, MEG or MeOH. The barrier fluid line BF from topside (valve V2) enables refilling the system with barrier fluid within volume 412, at intervals, for example to replace consumed barrier fluid. The liquid filled volume 414 will thus be pressurized with process fluid. This enables alleviation of potential contamination of the barrier fluid in the liquid filled volume 412 due to leakage of hydrocarbons from the process flowline or hydrate inhibitor from volume 414.

According to some embodiments, a fluid other than the process fluid could also be used to pressurize volume 414 (or volume 412). Such a fluid might be immiscible with the process fluid and thus, due to density differences, might be trapped inside volume 414. In such embodiments, volume 414 might be in communication with a supply of immiscible fluid such that the fluid within volume 414 could be topped up at intervals as the pressure in volume 414 fluctuates.

As illustrated in FIG. 4, the process pressure $P_{process}$ in volume 414 is working or "pushing" on the large diameter X of surface 424 of the piston 420, while the barrier fluid in volume 412 is pressurized by the small diameter Y of surface 422 of piston 420. The process fluid enters through valve V4 to pressurize volume 414, and consequently, the barrier fluid in volume 412 is separated by gas filled volume 416. According to some embodiments, the gas pressure in volume 416 is low compared to the process pressure $P_{process}$ such that the system hence works as a hydraulic amplifier or intensifier. The area difference between the surfaces 424 and 422 of piston 420 (corresponding to diameters X and Y) ensures that volume 412 has a higher pressure (given by the ratio of the respective areas) as long as the low pressure in the gas filled cavity 416 is does not substantially change (p*v=constant). The barrier fluid pressure in volume 412 is in this case given by:

$$P_{BF} = P_{process} \frac{A_{process}}{A_{BF}} P_{gas} \frac{Vol_{416-1}}{Vol_{416-2}} \frac{A_{process} A_{BF}}{A_{BF}}$$

Wherein $Vol_{416-1}$ and $Vol_{416-2}$ is the volume of cavity 416 at two different piston locations 1 and 2 (i.e. two different pressures as p*v=constant), $A_{process}$ is the area wherein the process pressure is applied (on diameter X of surface 424 in FIG. 4), $A_{BF}$ is the area wherein the barrier fluid is applied (on diameter Y of surface 422 in FIG. 4), and $P_{gas-1}$ is the pressure in volume 414 when piston 420 is in location 1 (corresponding to $Vol_{416-1}$). The amplification is, as can be seen from the equation, pressure dependent, depending on the location of piston 420, and thus volume 414 and volume 416. Note that in this configuration barrier fluid pressure regulator module 410 acts as a pressure intensifier. Further embodiments that include one or more pressure intensifiers for regulating barrier fluid pressure are shown and described herein, for example with respect to FIG. 7, infra. According to some embodiments, the gas pressure in volume 416 is not low compared to the process pressure $P_{process}$. In such cases the pressures can determined by calculating the pressure force due to the gas volume change in volume 416. According to some embodiments, using a higher gas pressure in volume 416 is used to modify the area ratio effect of the module 410. In this way the system 400 can be configured to provide the barrier fluid pressure at a variable proportion over the process fluid, with the proportion varying on factors such as gas pressure in volume 416 as well as the amount of barrier fluid in the system.

According to some embodiments, volume 414 can be connected to the barrier fluid side. In that case volume 412 would be connected to the process side, and the (high) gas pressure in volume 416 would ensure that the barrier fluid is kept at a pressure higher than the process pressure. Swapping barrier fluid and process fluid in FIG. 4, i.e. connecting the barrier fluid to volume 414 and the process flowline to volume 412 and pressurizing the gas filled cavity 416, will result in a gas spring design similar to the one depicted in FIG. 3. The gas filled cavity 416 separates the barrier fluid and process fluid volumes, 414 and 412 respectively, hence reducing the risk of process fluid ingress into the barrier fluid. The net pressure on the barrier fluid, if swapping compartments, is then given by:

$$p_{process} A_{process} + p_{gas} A_{gas} = p_{BF} A_{BF}$$

$$p_{BF} = \frac{p_{process} A_{process} + p_{gas} A_{gas}}{A_{BF}}$$

$$p_{BF} = \frac{p_{process} Y^2_{process} + p_{gas} (X^2_{BF} Y^2_{process})}{X^2_{BF}}$$

Where X is the larger diameter of the piston 420 (surface 424), Y is the smaller diameter of piston 420 (surface 422), and $A_{gas}$ is the section of the annulus area of volume 416. According to some other embodiments other configurations are possible where the gas, process and barrier fluid are arranged differently in volumes 412, 414 and 416. For example, volume 412 could be gas filled, and the volumes 414 and 416 in pressure communication with the process fluid and barrier fluid (either respectively or the opposite). In other examples, volume 414 could be gas filled, and the volumes 412 and 416 in pressure communication with the process fluid and barrier fluid (either respectively or the opposite).

FIG. 5 is a schematic diagram illustrating aspects of a barrier fluid pressure control system, according to some other embodiments. Barrier fluid pressure system 500 is similar to and can be used in many of the same applications as systems 200, 300 and 400 shown in and described with respect to FIGS. 2, 3 and 4. Additionally, barrier fluid pressure regulator module 310 can be similar or identical to module 310 shown and described with respect to FIG. 3, supra. In the case of FIG. 5, however, hydrocarbons from the process flowline are prevented from contaminating the barrier fluid in volume 314 in case of a seal leakage through the use of device 540. The process pressure $P_{process}$ is transferred to the barrier fluid through a barrier fluid bellow device 540. In these embodiments, both volumes 312 and 314 are filled with barrier fluid. According to some embodiments, device 540 could include a bladder accumulator 542 that is filled with barrier fluid. The bladder wall 544 will prevent process fluids in region 546 from entering into the barrier fluid system. The pressure inside the bladder 542 will be equal to process pressure. The bladder 542 is close to fully inflated with barrier fluid when the system is fully topped up and is at its lowest volume just before the system is topped up again with barrier fluid. If needed or desired, hydrate inhibitor might be used for cleaning and hydrate mitigation. For example, MeOH could be used for cleaning (flushing) and hydrate remediation of the process volume region 546.

Figure 6:
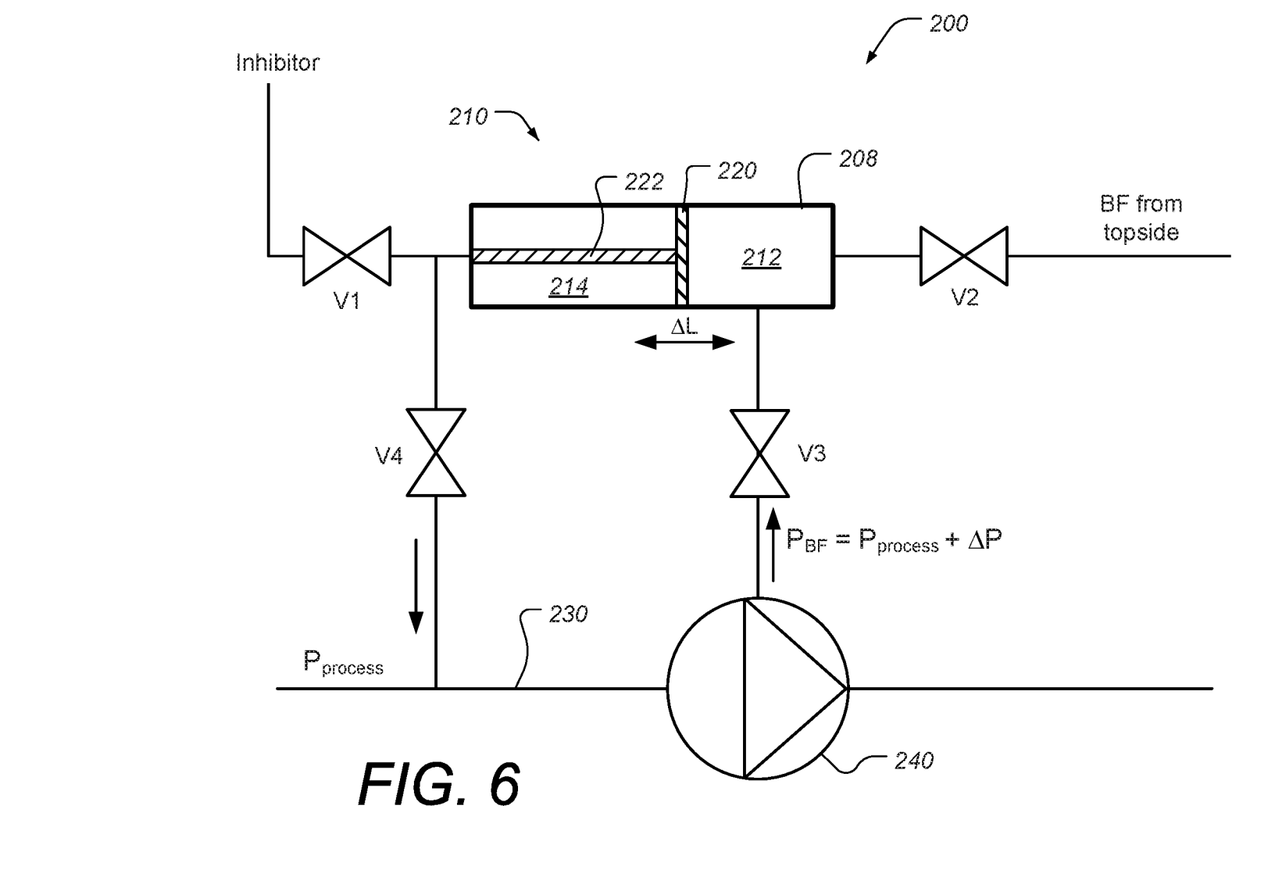
FIG. 6 is a schematic diagram illustrating aspects of a barrier fluid pressure control system providing rapid local depressurization and repressurization of barrier fluid, according to some embodiments.

FIG. 6 is a schematic diagram illustrating aspects of a barrier fluid pressure control system providing rapid local depressurization and repressurization of barrier fluid, according to some embodiments. Barrier fluid pressure system 200 shown in FIG. 6 is similar or identical to system 200 shown in FIG. 2, and it is illustrative of further aspects of a system configured to provide a rapid local de/repressurization of the barrier fluid. System 200 is similar to and can be used in many of the same applications as systems 300, 400 and 500 shown in and described with respect to FIGS. 3, 4 and 5. Volume 214 is in this case initially filled with process fluid (or hydrate inhibitor) and the spring 222 (which can be a gas spring, such as shown in FIGS. 3 and 5) is elongated (or compressed if located on the other side of piston 220). The valves V1, V2 and V3 are initially closed. The system 200 is configured to maintain a preset overpressure in the barrier fluid. In a case where a rapid pressure drop is required, the valve V2 can be closed (if open) and the valves V3 and V4 can be opened. Alternatively, V3 can be initially opened while V4 is closed. Opening valve V4 will then allow the spring 222 to contract thereby expanding volume 212 and reducing the barrier fluid pressure. The process fluid in volume 214 is then pushed into the flow line by the contracting spring 222 and the barrier fluid pressure in the pump is reduced due to barrier fluid expanding into the increasing volume of volume 212. The system 200 hence enables the barrier fluid pressure to be rapidly reduced or increased in applications in which water depth and umbilical length might make the conventional barrier fluid system response times unacceptable or impractical when faced with process side pressure fluctuations during, for instance, a pump trip or black out.

According to some embodiments of the disclosure, mechanical seals within the barrier fluid system can be maintained above the flow line pressure. Further, the barrier fluid system of the present disclosure allows for individual regulation (even each seal might be regulated individually). Each processing module 130 (shown in FIG. 1) may be provided with its own individual barrier fluid system(s), hence facilitating serial pumping.

According to some embodiments, a barrier fluid system is provided that allows for thermal expansion and/or contraction without the need for topside or subsea accumulators. According to some embodiments, a barrier fluid system is provided that can be used for long term subsea storage (for example, in case of abandonment of field cases). Additionally, a topside barrier fluid High Pressure Unit can be simplified as it might only be used to top up or refill subsea barrier fluid within the barrier fluid system of the present disclosure, for example, in case of barrier fluid consumption through the processing module.

According to some embodiments, a barrier fluid system is provided that enables pressure regulation to be performed locally and provides sufficient volumes locally to allow for thermal expansion and contraction. An overly low or negative differential pressure can cause process fluid ingress which can damage the pump, while an overly high differential pressure can damage the seals and hence the pump (or other fluid processing machine using the pressure system). When implementing a barrier fluid system according to some embodiments, there is no need or only a limited need for transient analysis and an advanced control system as is necessitated with known pressure compensation systems.

According to some embodiments, a barrier fluid system is provided that allows for easier pressure testing upon installation and before first use since the barrier fluid pressure will closely track the flow line pressure. The described barrier fluid system can allow for a reduced number and size of barrier fluid supply paths in umbilicals (or an ROV) and provides over-pressure with respect to the ambient pressure during installation and retrieval.

With conventional barrier fluid supply and pressure control systems, pressure testing can be a challenge, as the barrier fluid can be set in a high shut-in mode to ensure overpressure versus the process fluid. There is then a risk of negative differential pressure while increasing the pressure at the process side, especially for liquid filled systems. Depressurization after pressure testing can cause a too rapid pressure drop, hence damaging the mechanical seals due to a too high differential pressure. The system and method of the present disclosure can enable automatic and responsive adjustment to the barrier fluid pressure to maintain the desired over-pressure of the barrier fluid pressure compared to the process fluid pressure. Hence, the risk of damaging the pump can be mitigated.

Figure 7:
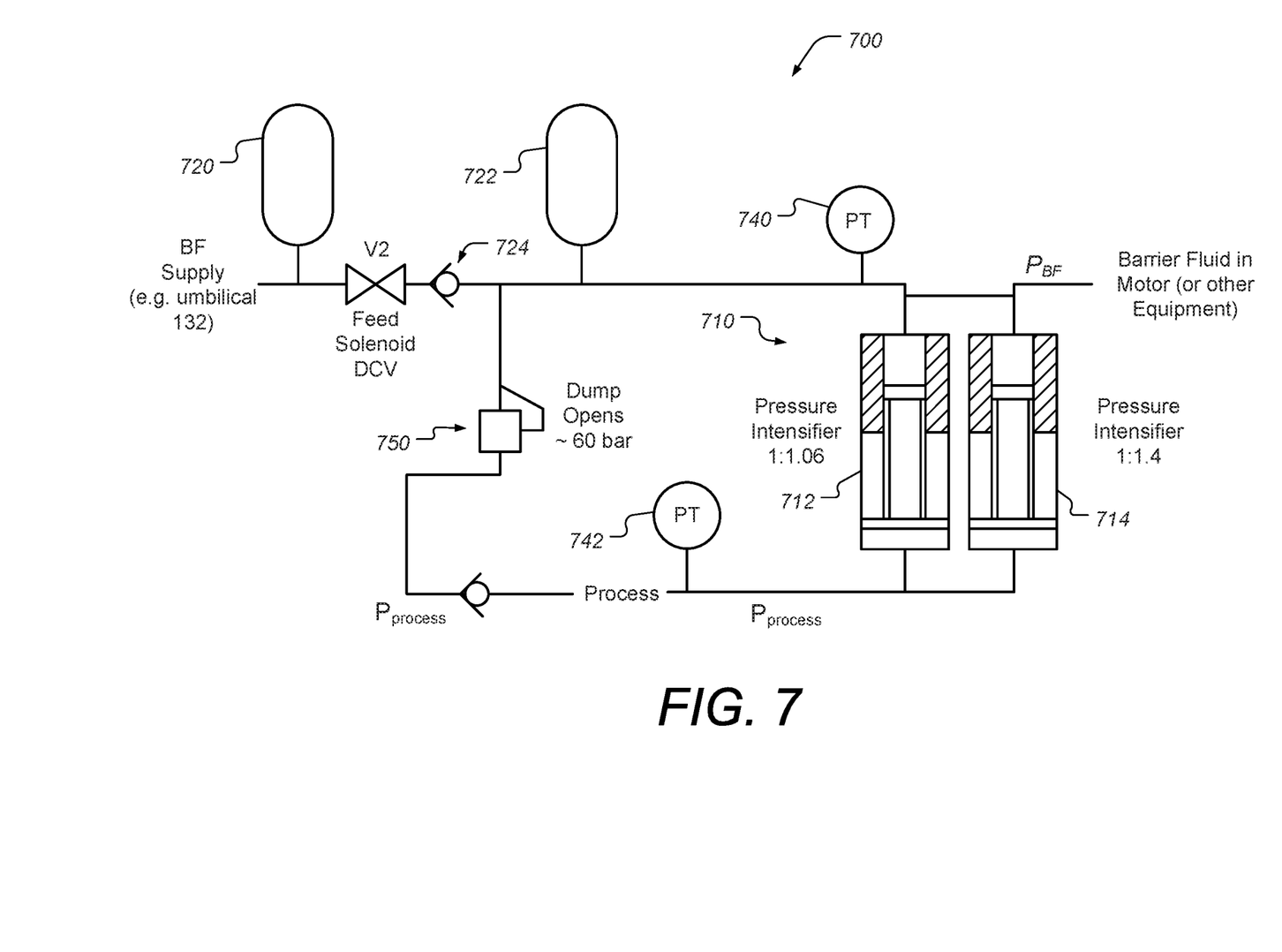
FIG. 7 is a schematic diagram illustrating aspects of a barrier fluid pressure control system, according to some other embodiments.

FIG. 7 is a schematic diagram illustrating aspects of a barrier fluid pressure control system, according to some other embodiments. Barrier fluid pressure system 700 is similar to and can be used in many of the same applications as systems 200, 300, 400 and 500 shown in and described with respect to FIGS. 2-6. Barrier fluid pressure regulator module 710 includes two pressure intensifiers 712 and 714. Pressure intensifiers 712 and 714 are configured, via a ratio of exposed surface areas to the two chambers (e.g. as shown and described in FIG. 4) to regulate the barrier fluid pressure remain between two set levels above the process pressure. In the example shown in FIG. 7, intensifier 712 is set to a ratio of 1:1.06, or 6% greater than the process pressure, while intensifier 714 is set to a ratio of 1:1.4, or 40% greater than the process pressure. According to some embodiments, in normal operation valve V2, which can be a directly controlled valve (DCV), can be set to regulate the barrier fluid pressure at a range of 6-40% above the process pressure, which ensures the pressure intensifiers 712 and 714 are positioned in their respective end positions. The system 700 will thus have the full capacity of the intensifiers 712 and 714 available in case of a rapid pressure increase or decrease. Note that other values besides 6% and 40% can be used depending upon the particular application at hand. Furthermore, according to some embodiments, the capacity of the system 700 can be scaled by installing multiple pressure intensifiers 712 and/or 714 in parallel.

The mechanical dump valve 750 will normally maintain the differential pressure below 60 bar and the feed valve V2 will maintain the barrier fluid pressure around 30 bar for example. If a rapid pressure decrease occurs in the pump operational area, e.g. after a pump trip, the pressure intensifier 714 will maintain the barrier fluid pressure at 40% higher than the process pressure. If the umbilical cannot supply a high pressure barrier fluid quickly enough from topside, pressure intensifier 712 will maintain a 6% overpressure. The check valve 724 will block barrier fluid from escaping into the umbilical for this scenario. Also visible in FIG. 7 are pressure sensors 740 and 742.

According to some embodiments, one or more pressure intensifiers such as intensifiers 712 and 714 can be used instead of, or in addition to, the barrier fluid regulator modules 210, 310, 410 and 510 shown in and described with respect to FIGS. 2-6.

Figure 8A:
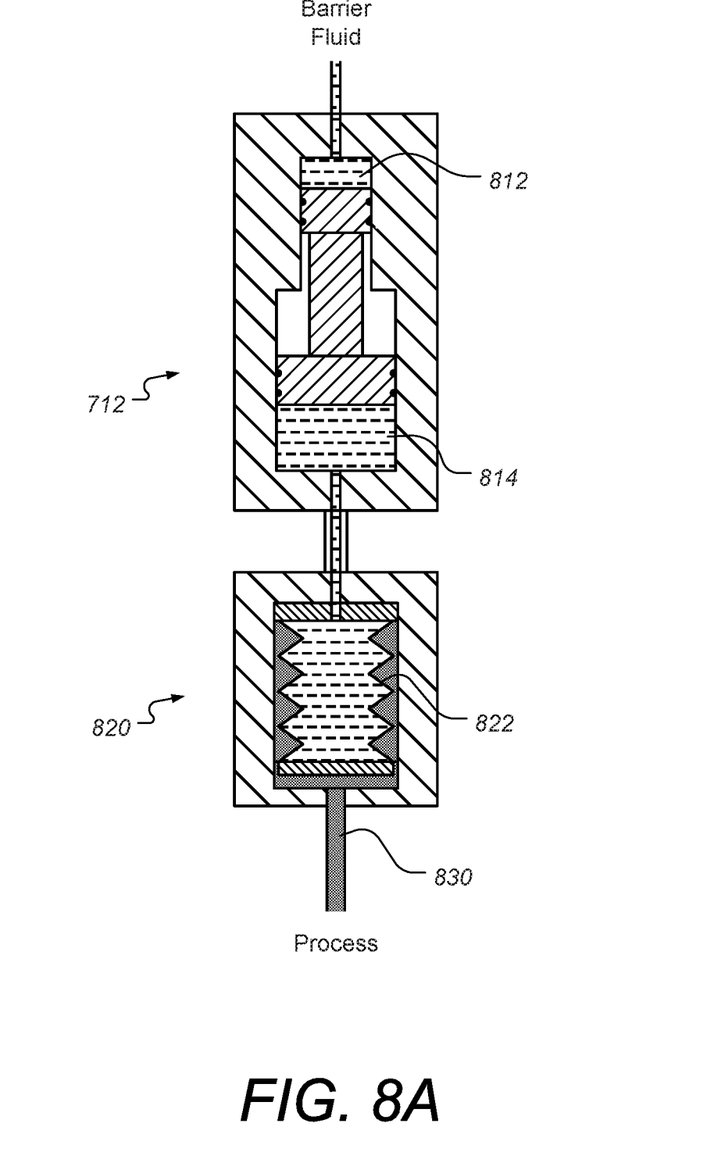
FIGS. 8A and 8B are diagrams illustrating aspects of protecting components in a barrier fluid pressure control system from process fluid intrusion, according to some other embodiments.
Figure 8B:
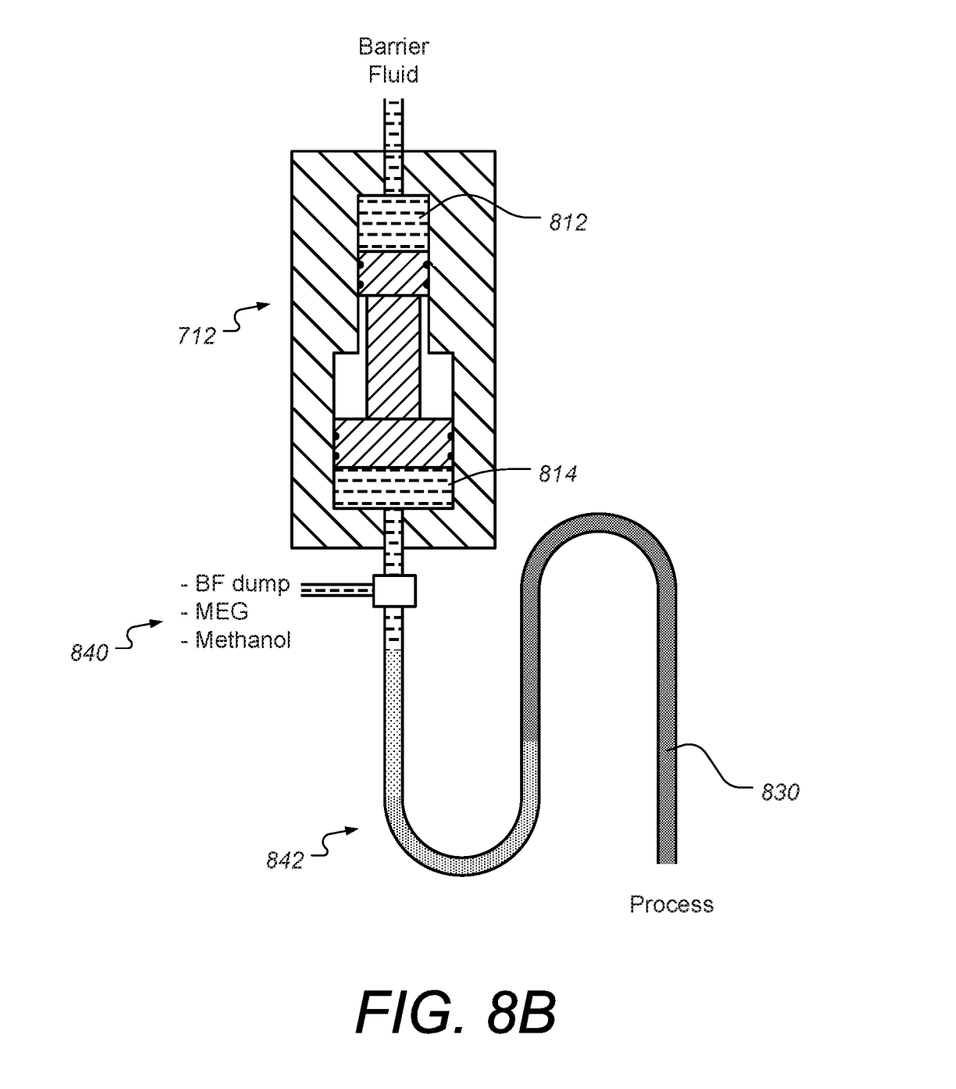

FIGS. 8A and 8B are diagrams illustrating aspects of protecting components in a barrier fluid pressure control system from process fluid intrusion, according to some other embodiments. In both FIGS. 8A and 8B a pressure intensifier 712 is shown that has one volume, 812 connected with the barrier fluid supply and another volume 814 that is pressure communication with the process fluid. It may be desirable to prevent process fluid from intruding into the volume 814 since such intrusion could increase the risk of degradation of components such as seals within the intensifier 712. Note that although intensifier 712 is shown in this example, according to some embodiments similar or identical techniques are used with respect to intensifier 714 in FIG. 7, as well as modules 210, 310, 410 and 510 in FIGS. 2-6.

In the case of FIG. 8A, intensifier 712 includes volume 812 that is in fluid and pressure communication with barrier fluid supplied to the pump or other fluid processing equipment, and volume 814 that is in pressure communication (i.e. the fluid pressure is matched with) the process fluid pressure. According to some embodiments, a bellows unit 820 is used to prevent process fluid in conduit 830 from entering volume 814 of intensifier 712. Bellows unit 820 includes a bellows membrane 822 that separates barrier fluid in its inner side and process fluid on its outer side. The bellows unit 820 thus maintains the fluid separation while allowing the fluid pressure in volume 814 to match the process fluid pressure.

In the case of FIG. 8B, process fluid intrusion into volume 814 of intensifier 712 is prevented using an injection of barrier fluid (or other fluid such as MEG or methanol) from port 840 that is in close proximity to volume 814 as shown. In the case of barrier fluid injection, in some case the port 840 can be connected to a barrier fluid dump valve such as valve 750 shown in FIG. 7. In this case a relatively long conduit 830 can be provided that allows the process fluid to be diluted to the point that any fluid close to the port 840 is free or nearly free of process fluid. The conduit 830 can also be shaped so as to create a "trap" arrangement due to density differences in the fluids. According to some embodiments, the port 840 can be used to continuously or periodically flush the conduit 830 with "clean" fluid such as barrier fluid, MEG or methanol. According to some embodiments, the timing and/or amount of injection fluid may be "smart" controlled, such as being altered depending on measurements and/or other factors. Although two example measures are shown in FIGS. 8A and 8B, according to some embodiments, other measures can be taken in addition to or instead of these measures. Examples of other measures include: a filter, a strainer, and a siphon or "water trap" principle.

According to some embodiments the barrier fluid systems described herein (e.g. systems 200, 300, 400, 500 and 700) could be used in settings other than subsea locations, such as on surface fluid processing facilities.

While the subject disclosure is described through the above embodiments, it will be understood by those of ordinary skill in the art that modification to and variation of the illustrated embodiments may be made without departing from the concepts herein disclosed.

What is claimed is:

1. A subsea pressure regulation system for barrier fluid used to lubricate and protect a subsea fluid processing machine configured to process a process fluid in a subsea location, the pressure regulation system comprising:
   a housing configured for deployment at the subsea location;
   a movable member disposed within the housing and configured to longitudinally translate within the housing, the member having at least first and second surfaces, the first surface and an inner portion of the housing defining a first volume and the second surface and an inner portion of the housing defining a second volume, the first and second volumes being variable in size depending on the longitudinal position of the moveable member, the first volume configured to be filled with barrier fluid and be in fluid communication with barrier fluid circulating in the fluid processing machine and the second volume configured to be pressure matched with the process fluid in the fluid processing machine;
   a biasing mechanism configured to maintain the fluid pressure of the barrier fluid circulating in the machine at a predetermined differential above the fluid pressure of the process fluid in the fluid processing machine at least in part by translation of the moveable member;
   a second housing;
   a second movable member disposed within the second housing and configured to longitudinally translate within the second housing, the second member having unequal third and fourth surfaces, the third surface and an inner portion of the second housing defining a third volume and the fourth surface and an inner portion of the second housing defining a fourth volume, the third and fourth volumes being variable in size depending on the longitudinal position of the second moveable member, the third volume configured to be filled with barrier fluid and be in fluid communication with barrier fluid circulating in the fluid processing machine and the fourth volume configured to be pressure matched with the process fluid in the fluid processing machine; and
   a second biasing mechanism configured to maintain the fluid pressure of the barrier fluid circulating in the machine at a second predetermined differential above the fluid pressure of the process fluid in the fluid processing machine at least in part by translation of the second moveable member, wherein the biasing mechanism and the second biasing mechanism together assuring that the fluid pressure of the barrier fluid circulating in the machine exceeds that of the process fluid in the fluid processing machine by an amount greater than or equal to the predetermined differential and less than or equal to the second predetermined differential; and
wherein:
   the area of the first surface is larger than the area of the second surface by a proportion of the area of the second surface; and
   the predetermined differential is a fixed proportion that is equal to the proportion that the area of the first surface is larger than the area of the second surface.

2. The system according to claim 1 wherein barrier fluid is added to the barrier fluid circulating in the machine by movement of the member towards the first volume thereby making the first volume smaller, and barrier fluid is removed from the barrier fluid circulating in the machine by movement of the member away from the first volume thereby making the first volume larger.

3. The system according to claim 1 wherein the biasing mechanism includes a spring configured to exert a force on the moveable member towards the first volume thereby causing pressure in the first volume to be greater than the second volume.

4. The system according to claim 3 wherein the spring is a mechanical spring positioned within the housing.

5. The system according to claim 3 wherein the spring is a gas spring.

6. The system according to claim 5 wherein the gas spring includes a third and fourth volume that are filled with gas.

7. The system according to claim 1 wherein the second volume is configured to be in fluid communication with the process fluid in the fluid processing machine.

8. The system according to claim 1 wherein the second volume fluidly isolated from the process fluid in the fluid processing machine using at least a flexible membrane.

9. The system according to claim 1 wherein the predetermined differential is a fixed amount.

10. The system according to claim 1 wherein the predetermined differential is fixed proportion.

11. The system according to claim 1 wherein the predetermined differential is a variable proportion that depends at least in part on a gas pressure in a gas volume within the housing.

12. The system according to claim 1 wherein the subsea location is a sea floor, the process fluid is hydrocarbon-bearing, and the fluid processing machine is a pump or compressor.

13. The system according to claim 1 wherein first volume is dimensioned to provide supply and removal of sufficient volumes of barrier fluid to allow for expected thermal expansion and contraction.

* * * * *